(12) United States Patent
Hsia et al.

(10) Patent No.: US 10,082,630 B1
(45) Date of Patent: Sep. 25, 2018

(54) PACKAGING OF AN OPTICAL FIBER HEAD IN HIGH-POWER LASER APPLICATIONS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 0 days.

(21) Appl. No.: 15/807,537

(22) Filed: Nov. 8, 2017

(51) Int. Cl.
| | |
|---|---|
| *G02B 6/36* | (2006.01) |
| *G02B 6/14* | (2006.01) |
| *G02B 6/32* | (2006.01) |
| *G02B 27/09* | (2006.01) |
| *G02B 6/26* | (2006.01) |
| G02B 6/255 | (2006.01) |

(52) U.S. Cl.
CPC ............. *G02B 6/3624* (2013.01); *G02B 6/14* (2013.01); *G02B 6/262* (2013.01); *G02B 6/32* (2013.01); *G02B 27/0927* (2013.01); *G02B 6/2551* (2013.01)

(58) Field of Classification Search
CPC ................................ G02B 6/36; G02B 6/3624
USPC .......................................................... 385/29
See application file for complete search history.

(56) References Cited

U.S. PATENT DOCUMENTS

| | | | | |
|---|---|---|---|---|
| 6,488,414 | B1* | 12/2002 | Dawes ................... | G02B 6/241 385/141 |
| 7,386,203 | B2* | 6/2008 | Maitland .............. | G02B 6/0008 385/141 |
| 7,565,084 | B1* | 7/2009 | Wach ................... | H04B 10/506 398/183 |
| 2007/0172174 | A1* | 7/2007 | Scerbak ............... | G02B 6/4296 385/76 |
| 2008/0056642 | A1* | 3/2008 | Byer .................... | G02B 6/4296 385/27 |
| 2013/0011102 | A1* | 1/2013 | Rinzler ................ | G02B 6/3813 385/89 |
| 2017/0329085 | A1* | 11/2017 | Kliner .................... | G02B 6/036 |
| 2018/0045895 | A1* | 2/2018 | Lee .......................... | G02B 6/14 |

* cited by examiner

*Primary Examiner* — Kaveh C Kianni
(74) *Attorney, Agent, or Firm* — Han IP Corporation; Andy M. Han

(57) ABSTRACT

A heat-reduced package of an optical fiber head comprising a delivery optical fiber (DOF), a cladding mode stripper, an optical end cap, a beam shaper, a window, and a housing operates for delivering the laser light from DOF to free space with a uniform temperature gradient inside the housing while maintaining beam quality. The cladding mode stripper comprising a section of cladding-exposed DOF inside bore of the glass ferrule fused together is effective to remove cladding modes from DOF. The optical end cap comprising a corrugated structure is configured to deflect the cladding modes, reduce optical feedback, and facilitate optical and thermal dispersion. The housing comprises another corrugated structure on an inner wall to absorb undesired optical energy. The housing may further comprise a cooling slot to disperse the heat accumulated in the housing to its surroundings.

17 Claims, 3 Drawing Sheets

PACKAGING OF AN OPTICAL FIBER HEAD IN HIGH-POWER LASER APPLICATIONS

TECHNICAL FIELD

The present disclosure relates to packaging of an optical fiber head used in high power laser delivery applications and, more particularly, to various optical and thermal dispersion schemes in packaging such an optical fiber head to maintain beam quality when a high-power laser light is delivered to free space and to improve its thermal performance and reliability.

BACKGROUND

High-power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of an optical fiber type, connected using fusion splices without air interfaces between any two of the optical components in connection. The optical components include multiple diode laser pumps with multiple optical fiber pigtails, an amplification optical fiber with two fiber Bragg gratings, a transmission fiber spliced to the amplification optical fiber, and an optical fiber combiner with multiple input optical fibers to splice to the multiple optical fiber pigtails of the multiple diode laser pumps and with an output optical fiber to splice to the amplification optical fiber. The amplification optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The amplification optical fiber with the gain medium receives and absorbs optical energy from the multiple diode laser pumps through the optical fiber combiner and creates a coherent laser light via a resonator built by using the two fiber Bragg gratings at two ends of the amplification optical fiber. Such multimode fiber lasers in the 2- to 6-kW regime are ideal for cutting and welding, and, particularly in the area of materials processing and laser machining as a reliable replacement for bulky diode pumped solid-state lasers and $CO_2$ lasers. It has been shown that lengthening the amplification optical fiber can inherently increase power of the fiber lasers without a limit. However, double clad optical fibers (DCOFs) used in both the output optical fiber of the optical fiber combiner and the amplification optical fiber are surrounded by a polymer coating with a limited tolerance to heat. In other words, the maximum thermal load provided by the coating dictates the maximum output power that the fiber laser can attain.

Not similar to optical fibers used in optical communications, where the coatings outside the optical fibers simply play a role of mechanical protection, the polymer coatings used in DCOFs perform both mechanical and optical functions. DCOFs use dual acrylate coatings, with a first low refractive index polymer coating in contact with the glass core, and with a durable second coating to protect the first relatively soft low refractive index coating. In other words, the second coating mechanically protects the low refractive index coating from mechanical chips, cuts, or scratches which may result in optical energy to leak out from the fiber, possibly creating localized hot spots or catastrophic burns at high pump powers. DCOFs with the dual acrylate coating can pass the stringent reliability test specified by Telcodia GR-20 standard used in the telecom industry. Without doubt, DCOFs with the dual acrylate coating have a high tensile strength of greater than 700 kpsi and an exceptional stress corrosion resistance. However, according to the GR-20 standard, after exposing DCOFs to an environment of 85° C. and 85% relative humidity (RH) for 720 hours, it shows an excess loss for laser output power due to possible degradation of the low refractive index coating in exposure to temperature and humidity. It is noted that the 85° C./85% condition not only affects the optical reliability of the low refractive index coating but also causes OH ingression into the glass core of the optical fiber, increasing attenuation of the glass core. For example, the attenuation in the typical pump wavelength range is well below a negligible 0.01 dB/m. After exposure the optical fiber to temperature and humidity, either wavelength-dependent or independent attenuation increases. The attenuation, in general, is associated with OH ingression in the silica, glass defects formed due to moisture ingression, and light scattered by the low refractive index polymer. That is, during the 85° C./85% RH test, moisture not only degrades the low-index polymer but also penetrates the glass cladding, resulting in the excess fiber loss.

In high-power laser delivery applications, a laser light or optical energy from a fiber laser is delivered to an application area using a transmission optical fiber or a delivery optical fiber. In the application area, the laser light must exit from an optical fiber end to free space. In order to maintain laser beam quality and prevent optical components upstream and downstream from damaging, a residual pump power, an amplified spontaneous emission (ASE) power, or an undesired signal power captured in the cladding of a DCOF in an optical fiber laser or an optical fiber amplifier needs to be removed. The residua pump power can be in hundreds of watts in kW fiber lasers and the ASE can be in the range of several tens of watts, typically much higher in a fiber amplifier. A conventional way to remove the cladding light is to remove the low refractive-index fluoroacrylic coating for a length of the optical fiber and re-coat with a high refractive-index coating. Such an optical component is called cladding mode stripper. In this approach, a high numerical aperture (NA) cladding light will be more effectively stripped than a low-NA cladding light. However, this approach remains very useful because the low-NA pump light in the cladding is, in fact, more strongly absorbed in a fiber laser, leaving more of the high-NA light in the residual pump in the cladding. One real issue is that the act of cladding stripping is occurred over just several millimeters, creating a localized hot spot, which needs to be thermally managed to prevent the cladding mode stripper from damaging. Several different cladding mode strippers with longitudinal variations have been proposed to improve hot spot localization but to suffer from increased complexity.

Surfaces substantially perpendicular to a laser propagating direction are vulnerable to the high power-density laser light because any of surface imperfections such as impurity, defects, and contamination and Fresnel reflections due to a refractive index change when the laser light moves between two media can lower a damage threshold of the surfaces, easily burning down the surface. That is one of reasons that a fiber laser system is so popular over a solid-state laser nowadays because the possible number of surfaces is minimized by splicing all the optical fiber components in the system together, thus significantly increasing system's reliability. In many fiber laser applications, the laser light must exit from an optical fiber to free space. With a coreless piece of optical fiber, so called optical end cap, placed between the output end of the fiber laser and the free space, the risk of damage at the end face can be dramatically reduced. In this case, the beam expands along the coreless end cap, thereby reducing an optical power density at the end face and also back reflection due to the divergence in the beam.

As mentioned above, the optical end cap sustainable at high power is critical for highly reliable high-power fiber lasers. In the high-power fiber lasers, an integrated water-cooled package has been proposed, in which an optical end cap is completely immersed in the circulating water for efficient cooling. In this case, however, OH ingression in the silica and glass defects generated from moisture ingression can reduce the reliability of such an optical end cap. It is, therefore, the purpose of this patent application to disclose several optical and thermal dispersion schemes that can be combined and used in packaging an optical end cap assembly to effectively remove heat from localized hot spots while maintaining a uniform temperature gradient in the optical end cap assembly, increasing reliability by not exposing optical components in the optical end cap assembly to cooling water, and improving laser beam quality by effectively removing cladding mode light.

SUMMARY

A heat-reduced package of an optical fiber head comprising a delivery optical fiber, an optical fiber end cap assembly, a beam shaper, a window assembly, and an integrated housing operates for delivering the laser light from the delivery optical fiber to free space with a uniform temperature gradient inside the housing.

The optical fiber end cap assembly comprises a cladding mode stripper, an optical end cap, and a housing. The cladding mode stripper comprises a section of the delivery optical fiber with a cladding exposed and a glass ferrule with the section of the delivery optical fiber with a cladding exposed inside the bore of the glass ferrule. When the bore of the glass ferrule is fused with the section of cladding-exposed delivery optical fiber, the cladding mode stripper becomes effective to remove cladding modes from the delivery optical fiber. The glass ferrule comprises a first corrugated structure on its lateral surface, configured to disperse optical and thermal dispersion. The optical end cap comprises a right circular cone portion and a cylindrical portion on connected to the right circular cone portion. The right circular cone portion comprises a conical surface, a small cross-section surface, and a large cross-section surface. The conical surface comprises a second corrugated structure configured to deflect cladding-mode light, reduce optical feedback, and facilitate optical and thermal dispersion when the optical end cap is served as a medium to deliver the laser light from the delivery optical fiber to free space. The housing comprises a third corrugated structure on an inner wall to absorb undesired optical energy. When the laser light is delivered from the delivery optical fiber, the cladding mode stripper removes residual pump energy from the cladding light, and the first corrugated structure on the glass ferrule scatters the stripped pump energy in a heat dispersion cavity enclosed by the third corrugated structure and the second corrugated structure. On the other hand, the reflected laser light from all the surfaces the laser light shines in free space, including a workpiece, is launched into the optical end cap, further refracted to enter the heat dispersion cavity. All of such undesired optical energy, forward and backward, is further scattered by the third corrugated structure and the second corrugated structure. The overall scattering is so random that the undesired optical energy is statistically distributed in the heat dispersion cavity. In other words, the heat generated is uniformly dissipated in the heat dispersion cavity, avoiding any localized hot spots. The three corrugated structures and configurations among the cladding mode stripper, the optical end cap, and the housing render a heat-reduced package of the optical fiber end cap reliably operable in a high-power laser delivery system.

In the embodiment, the housing may further comprise a cooling slot to disperse the heat accumulated in the housing to its surroundings. The cooling slot may be extended to cover not only area of the cladding mode stripper and the optical end cap but also the beam shaper to further improve thermal dispersion. When the cooling slot is filled with cooling water and covered or treated with a material such as a solution of rubber or copper press pressure tubes and fittings to prevent permeation by water at an end face of the cooling slot, none of the delivery optical fiber, the optical end cap, and the cladding mode stripper is immersed in the cooling water, thus increasing system's reliability.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
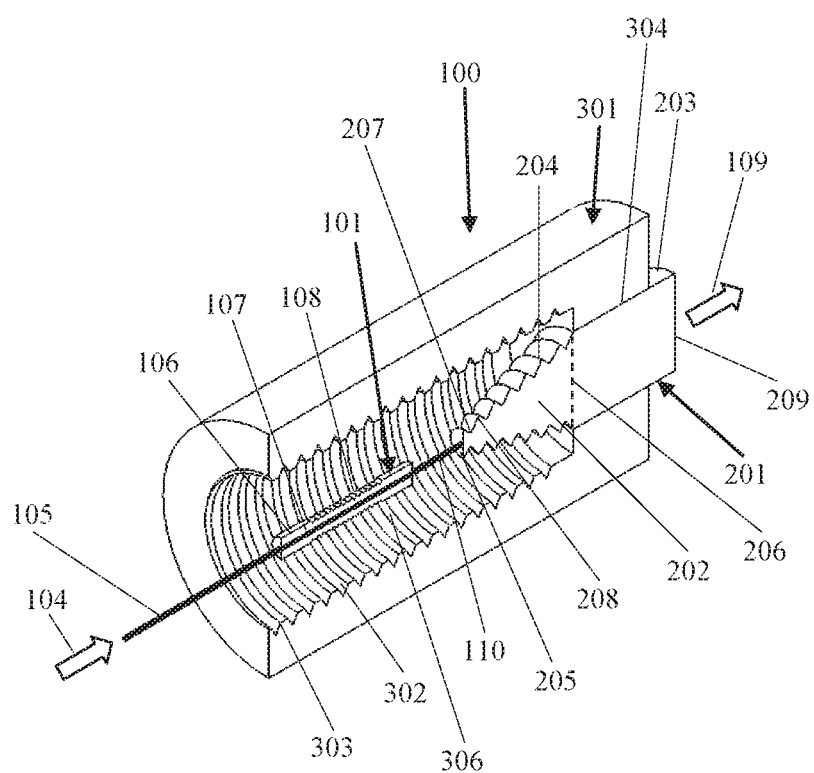
FIG. 1 is a cross-section view of a package of an optical fiber end cap assembly according to the present disclosure.

Reference will now be made in detail to the preferred embodiments of the disclosure. Wherever possible, same or similar reference numerals are used in the drawings and the description to refer to the same or like parts or steps. The drawings are in their simplest form and are not to scale.

FIG. 1 is a cross-section view of a package of an optical fiber end cap assembly according to the present disclosure. A package of an optical fiber end cap assembly 100 comprises a cladding mode stripper 101, an optical end cap 201, and a housing 301. The package of the optical fiber end cap assembly 100 receives a high-power laser light 104 via the delivery optical fiber 105 and emits a laser light 109 to free space. The cladding mode stripper 101 comprises a glass ferrule 106 and a section of delivery optical fiber 107 with its jacket or a surrounding coating removed. The section of delivery optical fiber 107 is inserted into a bore of the glass ferrule 106. Using oxyhydrogen flame or other high-temperature heating means to increase surface temperature of the glass ferrule 106 until the bore collapses to fuse together with the section of delivery optical fiber 107 inside the bore of the glass ferrule 106. In this case, no air interface will be formed between the section of delivery optical fiber 107 and the bore of the glass ferrule 106. Because a refractive index of the glass ferrule 106 is higher than that of the cladding, residual pump light in the cladding of the section of delivery optical fiber 107 is stripped off. This is different from prior art that a glass capillary is bonded to the envelope surface of the cladding using an adhesive or a cementing material, such as a glass epoxy with a proper refractive index. Experiments show that after a long-term exposure to high power laser radiation, the adhesive or the cementing material used is deteriorated, resulting in either a reduced bonding strength or a changed refractive index, eventually burning out the section of delivery optical fiber 107 inside the bore of the glass ferrule 106. In FIG. 1, the glass ferrule 106 comprises a first corrugated structure 108 on its lateral surface, configured to disperse optical and thermal dispersion. In an optical sense, the first corrugated structure 108 helps deflect and diffuse the cladding mode light stripped by the glass ferrule 106. In a thermal sense, the first corrugated structure 108 helps disperse heat accumulated in the cladding mode stripper 101.

In FIG. 1, the optical end cap 201 comprises a right circular cone portion 202 and a cylindrical portion 203 connected to the right circular cone portion 202. The right circular cone portion 202 comprises a small cross-section surface 205, a large cross-section surface 206, and a second corrugated structure 204 on a conical surface between the small cross-section surface 205 and the large cross-section surface 206. The large cross-section surface 206 is connected to the cylindrical portion 203 with an output cross-section surface 209 on the cylindrical portion 203. In order to reduce Fresnel reflection, the output cross-section surface 209 is anti-reflection (AR) coated. The cylindrical portion 203 comprises a lateral surface coated with gold. The second corrugated structure 204 has a conical angle determined by a slope of a line connecting the small cross-section surface 205 to the large cross-section surface 206 on the conical surface with the minimum distance. The second corrugated structure 204 comprises many roots 207 and crests 208 along the conical surface. A delivery optical fiber pigtail 110 from the cladding mode stripper 101 is fusion-spliced to the optical end cap 201 at a center position of the small cross-section surface 205 in the optical end cap 201. The small cross-section surface 205 has a diameter greater than a cladding diameter of the delivery optical fiber 105 plus two times a neighboring crest-root depth on the second corrugated structure 204. When the laser light is forward propagating from the cladding mode stripper 101, the stripped cladding light shines the optical end cap 201. The second corrugated structure 204 can effectively deflect, scatter, and disperse the stripped cladding light. For the laser light backward propagating from reflected surfaces away from the output cross-section surface 209, the second corrugated structure 204 can still effectively deflect, scatter, and disperse the reflected laser light so as not to feedback to the delivery optical fiber 105, creating burning problems. In addition, the second corrugated structure 204 can help disperse heat from accumulating in the optical end cap 201. As mentioned above, the optical end cap 201 is, in fact, a coreless piece of optical fiber, which is spliced to the output end of the delivery optical fiber 105 (i.e. the delivery optical fiber pigtail 110) from the cladding mode stripper 101 to reduce power density of the laser light delivered. When a laser beam exiting from the delivery optical fiber pigtail 110 launches into the optical end cap 201, the beam, which is Gaussian, expands without core guiding along the optical end cap 201 with a divergence angle determined by a diffraction-limited condition, thus reducing an optical power density at the end face and also back reflection due to the divergence of the beam. The conical angle of the second corrugated structure 204 in the right circular cone portion 202 must be greater than the divergence angle of the laser beam propagating in the optical end cap 201 to ensure no optical clipping occurred.

In FIG. 1, the housing 301, having a counterbore structure with a large diameter bore 303 and a small diameter bore 304, comprises a third corrugated structure 302 on an inner wall of the large diameter bore 303. The large diameter bore 303 is longer than the small diameter bore 304. The small diameter bore 304 is used to accommodate the optical end cap 201 and is hence concentrically mated with the lateral surface of the cylindrical portion 203 in the optical end cap 201. The cylindrical portion 203 with the lateral surface coated with gold may be fixed in the small diameter bore 304, which is made of copper, using a solder to ensure a long-term operation without failure. Once the optical end cap 201 is fixed in the small diameter bore 304, a heat dispersion cavity 306 is formed around the third corrugated structure 302 and the second corrugated structure 204 in the optical end cap 201.

When the laser light 104 from a fiber laser or a fiber amplifier reaching kWs or tens of kWs is delivered, an optical energy leakage from both forward and backward propagating core-guided light to the adjacent cladding at air-quartz interfaces becomes powerful enough. Once in the cladding, the optical energy leakage induces thermal loads on a polymeric coating surrounding the cladding. If not completely stripped, the optical energy leakage may, in the worst cast, cause the delivery optical fiber pigtail 110, the cladding mode stripper 101, and the optical end cap 201 to burn out. When the laser light is incident, the cladding mode stripper 101 removes residual pump energy from the cladding light, and the first corrugated structure 108 on the glass ferrule 106 scatters the stripped pump energy in the heat dispersion cavity 306 enclosed by the third corrugated structure 302 and the second corrugated structure 204. On the other hand, the reflected laser light from any surfaces in free space, including a workpiece, is launched into the optical end cap 201, further refracted to enter the heat dispersion cavity 306. All of such undesired optical energy, forward and backward, is further scattered by the third corrugated structure 302 and the second corrugated structure 204. The overall scattering is so random that the undesired optical energy is statistically distributed in the heat dispersion cavity 306. In other words, the heat generated is uniformly dissipated in the heat dispersion cavity 306, avoiding any localized hot spots. The three corrugated structures 108, 204, and 302 and configurations among the cladding mode stripper 101, the optical end cap 201, and the housing 301 render a heat-reduced package of the optical fiber end cap reliably operable in a high-power laser delivery system. For various applications, the delivery optical fiber in a laser delivery system may comprise a single-mode optical fiber, a multi-mode optical fiber, a double-clad optical fiber, a polarization-maintaining optical fiber, or an amplification optical fiber.

Figure 2:
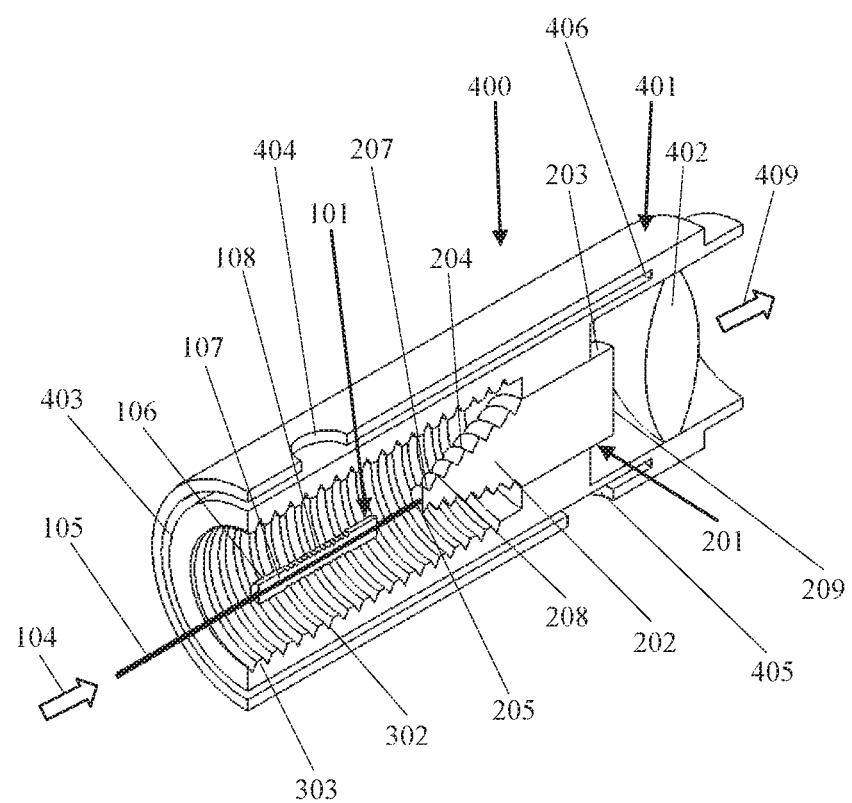
FIG. 2 is a cross-section view of a package of an optical fiber end cap assembly with a cooling structure according to the present disclosure.

FIG. 2 is a cross-section view of a package of an optical fiber end cap assembly with a cooling structure according to the present disclosure. The package of an optical fiber end cap assembly with a cooling structure 400 in FIG. 2 is similar to the package of an optical fiber end cap assembly 100 in FIG. 1 except that a housing 401 in FIG. 2 is extended for a length to include a beam shaper 402 and comprises a cooling slot 403 between the outer wall and the inner wall in the large diameter bore 303. The cooling slot 403 is also extended to cover the corrugated structure 302 and reach a position 406 near the beam shaper 402. The beam shaper 402 is placed in front of the optical end cap 201 to convert an expanded Gaussian beam spot created by the optical end cap 201 into a focused beam spot working on a workpiece. Similar to FIG. 1, the package of the optical fiber end cap assembly 400 receives the high-power laser light 104 via the delivery optical fiber 105 and emits a laser beam 409 in free space. The reflected laser light from a workpiece shines the beam shaper 402, creating heat, which can be thermally conducted to the housing 401 to dissipate. The housing 401 may further comprise an inlet 404 and an outlet 405 for forced air or cooling water, as a heat transfer medium, circulating in the cooling slot 403 in the housing 401. This kind of heat exchange can effectively remove the heat from not only the corrugated structure 302 but also the beam shaper 402 to surroundings. When the cooling slot 403 is filled with cooling water and covered or treated with a material such as a solution of rubber or copper press pressure tubes and fittings to prevent permeation by the cooling water at an end face of the cooling slot 403, the cooling water is separated by the inner wall of the large diameter bore 303 in the housing 401. In that case, none of the delivery optical fiber 105, the optical end cap 201, and the cladding mode stripper 101 is immersed in the cooling water, thus increasing system's reliability. For various applications, the beam shaper 402 may comprise several beam-shaping lenses to control output shapes of a laser beam such as a flat top beam shape.

Figure 3:
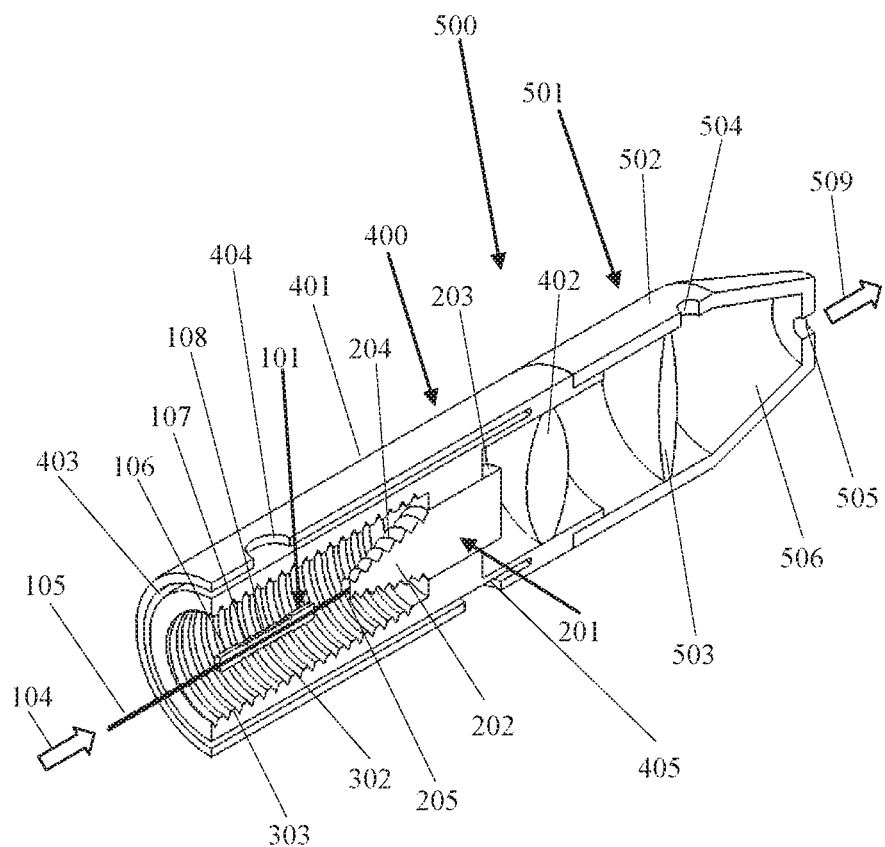
FIG. 3 is a cross-section view of a package of an optical fiber head assembly according to the present disclosure.

FIG. 3 is a cross-section view of a package of an optical fiber head assembly according to the present disclosure. A package of an optical fiber head assembly 500 comprises the package of an optical fiber end cap assembly 400 depicted in FIG. 2 and a widow assembly 501. The window assembly 501 comprises a housing 502, a protective lens 503, a gas inlet 504, and an outlet hole 505 for a laser beam exit. That is, the package of the optical fiber head assembly 500 receives the high-power laser light 104 via the delivery optical fiber 105 and emits a laser light 509 via the protective lens 503 and the outlet hole 505 to a workpiece. The housing 502 is coaxially connected to the housing 401 of the optical end cap assembly 400. The protective lens 503 is installed in the housing 502 at a position between the beam shaper 402 and the gas inlet 504 with the outlet hole 505 close to the gas inlet 504, where a front-end cavity 506 enclosed by the protective lens 503, the outlet hole 505, and an inner wall of the housing 501 is formed. The gas inlet 504 is used to blow pressured nitrogen, oxygen, or air into the front-end cavity 506. Because the front-end cavity 506 is sealed except the outlet hole 505, the gas blown in comes out from the outlet hole 505 with an air flow, which prevents most of small foreign objects from entering the front-end cavity 506 and damaging the window 503.

Whereas preferred embodiments of the present disclosure have been shown and described, it will be realized that alterations, modifications, and improvements may be made thereto without departing from the scope of the following claims. Another package of an optical fiber end cap and an optical fiber head assembly with a heat-reduced or heat-sinking means using various kinds of combinations to accomplish the same or different objectives could be easily adapted for use from the present disclosure. Accordingly, the foregoing descriptions and attached drawings are by way of example only, and are not intended to be limiting.

What is claimed is:

1. A heat-reduced package of an optical fiber head, comprising:
   a delivery optical fiber configured to transport a laser light;
   a cladding mode stripper comprising a section of the delivery optical fiber with a cladding exposed and a glass ferrule enclosing the section of the delivery optical fiber with the cladding exposed, the glass ferrule comprising a first corrugated structure on a lateral surface;
   an optical end cap fusion-spiced with a delivery optical fiber pigtail from the cladding mode stripper, comprising a right circular cone portion and a cylindrical portion connected to the right circular cone portion, wherein a combination thereof comprises a conical surface, a small cross-section surface, and a large cross-section surface, wherein the conical surface comprises a second corrugated structure configured to deflect a cladding-mode light, reduce optical feedback, and facilitate optical and thermal dispersion, and wherein the optical end cap is configured to deliver the laser light from the delivery optical fiber to free space;
   a beam shaper installed in front of the optical end cap in a forward propagation direction of the laser light and optically aligned with the optical end cap, the beam shaper configured to convert a Gaussian beam spot into a focused beam spot; and
   a housing comprising an outer wall, a counterbore structure with a small-diameter-bore inner wall and a large-diameter-bore inner wall, and a third corrugated structure on the large-diameter-bore inner wall, the housing configured to facilitate thermal dispersion, wherein the cylindrical portion of the optical end cap is fixed in the housing, and wherein a heat dispersion cavity enclosed by the optical end cap and the large-diameter-bore inner wall is formed,
   wherein the first corrugated structure on the glass ferrule is configured to remove cladding modes, reduce optical feedback, and facilitate optical and thermal dispersion, and
   wherein the delivery optical fiber pigtail is fusion-spliced with the optical end cap on the small cross-section surface to eliminate an air interface thereof and reduce power density not exceeding a damage threshold.

2. The heat-reduced package of claim 1, wherein the delivery optical fiber comprises a single-mode optical fiber, a multi-mode optical fiber, a double-clad optical fiber, a polarization-maintaining optical fiber, or an amplification optical fiber.

3. The heat-reduced package of claim 1, wherein an angle between a conical surface of the right circular cone portion and an axis thereof is greater than a divergence angle of the laser light propagating in the optical end cap to avoid optical loss and beam quality degradation due to optical clipping.

4. The heat-reduced package of claim 1, wherein the small cross-section surface has a diameter greater than a cladding diameter of the delivery optical fiber plus two times a crest-root depth in the second corrugated structure.

5. The heat-reduced package of claim 1, wherein the large cross-section surface comprises an anti-reflection (AR) coating to increase a damage threshold.

6. The heat-reduced package of claim 1, wherein the cylindrical portion of the optical end cap is concentrically mated with the small-diameter-bore inner wall in the housing.

7. The heat-reduced package of claim 1, wherein a lateral surface of the cylindrical portion is coated with gold, substantially in contact with the small-diameter-bore inner wall.

8. The heat-reduced package of claim 7, wherein the small-diameter-bore inner wall is made of copper, and wherein a solder is used to fill gaps between the lateral surface of the cylindrical portion and the small-diameter-bore inner wall and to fix the cylindrical portion.

9. The heat-reduced package of claim 1, wherein the section of the delivery optical fiber with the cladding exposed is inside a bore of the glass ferrule and fused thereof without an air interface.

10. The heat-reduced package of claim 1, wherein the housing further comprises a cooling slot between the large-diameter-bore inner wall and the outer wall and between the small-diameter-bore inner wall and the outer wall, and wherein the cooling slot is configured to facilitate thermal dispersion.

11. The heat-reduced package of claim 10, wherein the cooling slot is filled with cooling water and is waterproof at an end face of the cooling slot such that none of the delivery optical fiber, the optical end cap, and the cladding mode stripper is immersed in the cooling water.

12. The heat-reduced package of claim 10, wherein the cooling slot is configured to facilitate a forced air flow to remove heat.

13. The heat-reduced package of claim 1, wherein the housing further comprises two openings on the outer wall for an inlet and an outlet of cooling water or forced air to facilitate heat exchange.

14. The heat-reduced package of claim 1, wherein the window assembly further comprises a gas inlet, at a position between the window and the outlet hole, configured to blow nitrogen, oxygen, or air into the front-end cavity forming an air flow to cool off the window assembly and prevent small foreign objects from entering the outlet hole and damaging the window.

15. The heat-reduced package of claim 1, wherein the third corrugated structure in the housing comprises internal threads.

16. The heat-sinking package of claim 1, wherein the third corrugated structure in the housing further comprises a dark tone, configured to absorb optical energy escaped from the cladding mode stripper and the optical end cap.

17. The heat-reduced package of claim 1, wherein the beam shaper comprises several beam-shaping lenses configured to convert a Gaussian beam into flat top or other desired beam shapes.

* * * * *